Patented Jan. 27, 1942

2,271,384

UNITED STATES PATENT OFFICE 2,271,384

THREE COMPONENT INTERPOLYMERS

Harold Wilfred Arnold, Marshallton, Del., assignor to E. I. du Pont de Nemours & Company, Wilmington, Del., a corporation of Delaware No Drawing. Application April 1, 1940,
Serial No. 327,321

12 Claims. (Cl. 260—84)

This invention relates to synthetic organic resinous materials and more particularly to interpolymers of unsaturated compounds.

Interpolymerization of certain unsaturated compounds, for example, vinyl acetate and methyl methacrylate, generally leads to polymers whose non-homogeneity is, at least for some purposes, disadvantageous.

This invention has as an object the preparation of homogeneous interpolymers. A further object is to provide useful interpolymers of unsaturated compounds. A still further object is to provide homogeneous, multi-component interpolymers. Another object is the preparation of homogeneous three component interpolymers from mixtures of monomers, two of which if polymerized together in the absence of the third component would form non-homogeneous polymerizates. Other objects will appear hereinafter.

These objects are accomplished by the following invention wherein a monomeric polymerizable open chain conjugated diene preferably of the formula $H_2C=CR^1-CR^2=CH_2$ wherein $R^1$ and $R^2$ may be hydrogen, chlorine, cyanogen or methyl groups, a monomeric polymerizable ester of a saturated monohydric alcohol with an open chain monocarboxylic acid having a methylene ($CH_2$) group attached by an ethylenic double bond to the carbon alpha to the carboxyl carbon and a vinyl ester of an aliphatic open chain monocarboxylic having only saturated linkages between the carbons alpha and beta to the carboxyl are polymerized to homogeneous interpolymers.

In the process of the present invention a monomeric polymerizable open chain conjugated diene preferably of the formula $H_2C=CR^1-CH^2=CH_2$, wherein $R^1$ and $R^2$ are as defined above and a monomeric polymerizable vinyl ester of an alpha-beta saturated aliphatic open-chain monocarboxylic acid are polymerized to homogeneous interpolymers by incorporating in the mixture to be polymerized a polymerizable monomeric ester of a monohydric alcohol with an aliphatic open-chain monocarboxylic acid having a methylene group attached by an ethylenic double bond to the carbon alpha to the carbonyl group. Polymerization can be carried out by any of the known methods of polymerization in closed or open vessels in the presence or absence of catalytic materials and under suitably controlled temperature conditions. In the preferred practice of the invention the mixture of monomeric constituents is polymerized in aqueous emulsion in a closed vessel and in the presence of a catalyst capable of liberating oxygen.

Considerable variation in the properties of the interpolymers can be produced both by (1) variations in monomer proportions and by (2) the selection of different members of the groups of compounds defined above.

If the three components selected are chloroprene, vinyl acetate, and methyl methacrylate, relatively high initial percentages of chloroprene lead to products which tend to have predominantly rubber-like properties. Relatively high initial percentages of vinyl acetate, on the other hand, lead to relatively low-softening, thermoplastic, soluble products which appear best adapted for use in lacquers. High initial percentages of methyl methacrylate give products which are relatively high-softening and when molded produce articles which are characterized by good strength and toughness. If methyl methacrylate is completely replaced by methyl acrylate, the polymer produced is considerably softer and more extensible than the product formed from the monomer mixture containing methyl methacrylate. Similarly, replacement of vinyl acetate by a higher vinyl ester such as vinyl propionate or vinyl butyrate or substitution of butadiene or isoprene for the chloroprene alters the properties of the interpolymers formed, generally leading to the formation of lower softening and more flexible products.

The more detailed practice of the invention is illustrated by the following examples, wherein parts given are by weight. There are of course many forms of the invention other than these specific embodiments.

Example I

A mixture of 45.7 parts of methyl methacrylate, 38.8 parts of vinyl acetate, 15.5 parts of chloroprene and 1 part of benzoyl peroxide is added to a solution of 5 parts of a mixture consisting principally of the sodium salt of alpha-acetoxyoctadecane sulfate (prepared by acetylating the commercial oleyl alcohol known as "Ocenol" and then sulfating the unsaturated acetylated compound) in 300 parts of water. The mixture is well stirred and heated at 75° C. during 17.5 hours in a vessel equipped with a reflux condenser. The emulsion thus formed is poured into a large volume of water, heated to 80° C., and precipitated by the addition, with stirring, of a 10% aqueous solution of aluminum sulfate. The product precipitates in the form of soft lumps. These are repeatedly washed with water and finally with methanol yielding a thermoplastic material well suited to the preparation of tough films and sheets.

Example II

A mixture of 42 parts of vinyl acetate and 0.4 part of benzoyl peroxide is added to a solution of 8 parts of a mixture consisting principally of the sodium salt of alpha-acetoxyoctadecane sulfate in 300 parts of water. The whole is heated at 75° C. in a vessel carrying a stirrer and a reflux condenser. After about 20 minutes the slow addition of a mixture of 48 parts of methyl methacrylate, 10 parts of chloroprene, and 0.6 part of benzoyl peroxide is begun. The addition requires about 3.5 hours. After the addition is complete, heating and stirring are continued for about 1.5 hours. The resulting emulsion is precipitated and the product washed as in Example I. By the application of heat and pressure the product is converted to tough, somewhat elastic foils or sheets.

Example III

A mixture of 70 parts of methyl methacrylate, 30 parts of chloroprene, and 30 parts of vinyl acetate is emulsified by stirring with a solution composed of 370 parts of water, 5.5 parts of a mixture consisting principally of the sodium salt of alpha-acetoxyoctadecane sulfate, and 4.5 parts of 30% hydrogen peroxide. The mixture is stirred and heated at 55° C. for a total of about 50 hours. At the beginning a sample of the mixture has a specific gravity of 0.995 at 25° C. while at the end of the period the specific gravity at 25° is 1.030. The mixture is steam-distilled to remove residual monomers and then treated as in Example I. The product precipitates in flocculent form. It is readily molded or formed under heat and pressure to give tough, flexible articles, or dissolved in typical solvents, for example, toluene, butyl acetate, dioxan.

Example IV

A mixture of 90 parts of methyl methacrylate, 20 parts of chloroprene, and 20 parts of vinyl acetate is emulsified by stirring in a mixture consisting of 370 parts of water, 5.5 parts of a mixture consisting principally of the sodium salt of alpha-acetoxyoctadecane sulfate, and 4.5 parts of 30% hydrogen peroxide. The resulting emulsion is heated at 55° C. until the specific gravity at 25° C. reaches 1.015. It is then steam-distilled and the polymer isolated as in Example I. The polymer can be molded under heat and pressure to give tough articles which have greater hardness than those formed from the product of Example III, or dissolved in toluene to give solutions suitable for use in coating compositions.

According to the present invention, homogenous interpolymers can be obtained from mixtures of any polymerizable monomeric open-chain aliphatic diene as above defined with any polymerizable monomeric vinyl ester of an alpha, beta-saturated aliphatic open-chain monocarboxylic acid by incorporating in the polymerization mixture any polymerizable monomeric ester of a monohydric alcohol with an aliphatic monocarboxylic acid having a methylene group attached by means of an ethylenic double bond to a carbon in a straight chain, said carbon being alpha to the carboxyl, i. e., a polymerizable monomeric monohydric alcohol ester of an alpha methylene aliphatic monocarboxylic acid. Exemplary dienes are 1,3-butadiene, 2-chloro-1,3-butadiene, 1-cyano-1,3-butadiene, isoprene, 2,3-dimethyl-1,3-butadiene. Exemplary vinyl esters are vinyl acetate, vinyl propionate, vinyl butyrate, vinyl chloroacetate, vinyl lactate, vinyl laurate, vinyl stearate, vinyl oleate, vinyl α-toluate. Exemplary esters of alpha-methylene acids are methyl methacrylate, ethyl methacrylate, butyl methacrylate, octyl methacrylate, dodecyl methacrylate, methoxyethyl methacrylate, chloroethyl methacrylate, cyclohexyl methacrylate, phenyl methacrylate, benzyl methacrylate, methyl acrylate, amyl acrylate, methyl α-ethyl acrylate, methyl atropate, methyl α-chloroacrylate.

The selection of ingredient proportions is determined by the properties it is desired the interpolymers shall have and since the introduction of relatively small percentages of certain ingredients frequently produce marked changes in properties, it is not intended that any definite limits shall be set on the proportions of ingredients which may be used, although for practical purposes it will usually be found that no one ingredient will constitute more than about 80% nor less than about 5% by weight of the entire monomer mixture.

The polymerization may be effected in various ways, e. g. in bulk, in solution, by the "granular" method, and by the "emulsion" method. In the first method the mixture of monomers without diluent and containing, if desired, a small percentage of a polymerization catalyst is caused to polymerize. The product in this case is a solid mass. In the solution method the polymerization may be carried out in a medium which is a solvent for the monomer mixture but a non-solvent for the polymer, or the polymerization may be carried out in a medium which is a solvent both for the monomers and the polymers. In the first modification of the solution method solvents such as aliphatic alcohols, aliphatic hydrocarbons, and mixtures of water and lower aliphatic hydrocarbons may be used, and the polymers are usually precipitated as they are formed in finely divided or flocculent form. In the second modification of the solution method the products are obtained in the form of more or less viscous solutions which may if desired be used directly as coating compositions.

In the "granular" method the monomer mixture containing a small percentage of a peroxidic polymerization catalyst such as benzoyl peroxide, dibutyryl peroxide, or the like, is rapidly agitated with an aqueous solution containing a small percentage (up to about 2%) of a protective colloid of the type of soluble starch, methyl starch, partially hydrolyzed polyvinyl acetate, the sodium salts of polymers or interpolymers containing acrylic or methacrylic acid, polymethacrylamide, sodium starchglycolate, sodium celluloseglycolate, etc. in a vessel equipped with a reflux condenser, at such temperatures that moderate reflux is maintained. Under these conditions the monomer is dispersed in the form of small droplets which solidify as polymerization proceeds to give the polymer in the form of small granules or globules. These remain suspended in the aqueous medium so long as rapid agitation is maintained but settle out rapidly when agitation is suspended. The granules are readily filtered from the mixture, washed free of occluded protective colloid, and dried.

In the "emulsion" method the mixture of monomers is agitated continuously or intermittently with an aqueous solution containing a small percentage (up to about 3%) of any emulsifying and/or dispersing agent such as (1) alkali metal, ammonium, or amine salts of fatty acids, for example, sodium, potassium, or ammonium palmitate, Marseilles soap, mono-, di-, and triethanolamine salts of lauric or palmitic acids, (2) quaternary ammonium salts such as cetyltrimethylammonium bromide, (3) salts of true sulfonic acids such as alkyl naphthalenesulfonic acids, (4) salts of long chain acid sulfates such as alpha-acetoxyoctadecane sodium sulfate, and (5) salts of long chain monoamides of dibasic acids. After polymerization is complete the product remains dispersed in the aqueous medium and the resulting dispersion may be used as such in a variety of coating applications or the product may be precipitated by the addition of an electrolyte such as an inorganic non-oxidizing acid or an inorganic salt. The polymerization products may also be separated by cataphoresis, by chilling, or by the addition of water soluble monohydric alcohols. After precipitation the product is filtered and washed thoroughly with water to remove traces of occluded dispersing agent.

In a modification of the emulsion method the monomers and dispersing medium are introduced simultaneously in proper proportions into the lower end of a slightly inclined heated tube and the mixture pumped through the tube at such rate that polymerization is virtually complete when the mixture reaches the upper end of the tube. Such a process can be made continuous if desired. In a further variation of the emulsion method the monomers are polymerized in an indifferent organic solvent which is a solvent for the monomers but a non-solvent for the polymer and which contains a small percentage of an emulsifying agent which is soluble in the solvent and shows some solvent action on the monomer or polymer.

In all of the methods outlined above, polymerization is accelerated by heating to temperatures from about 30° C. to about 100° C., by irradiating with ultra-violet light, by the addition of polymerization catalysts such as ozone, hydrogen peroxide, sulfur dioxide, organic or inorganic peracetates, perborates, or persulfates, acetyl benzoyl peroxide, dibutyryl peroxide, dilauryl peroxide, benzoyl peroxide, succinyl peroxide, or the like, or by combinations of these factors. The catalyst concentration can be varied within wide limits, for example, from about 0.01% to about 3%.

The time required for polymerization is largely dependent on the conditions used and can vary from a few minutes to several days, being longer at lower temperatures.

The interpolymers herein described can be used for the preparation of molded articles and films. They are useful in the preparation of molded articles when modified or mixed with plasticizers, fillers, pigments, dyes, stabilizers, and other natural or synthetic resins. The products can be used as adhesives, and as coating compositions either alone or admixed with other resins, pigments, dyes, plasticizers, stabilizers, etc. Such compositions are useful for coating or impregnating surfaces such as wood, textiles, leather, metals, glass, paper, stone, brick, concrete, plaster, cellulose film, fingernails, and the like.

It is well known to those acquainted with the field of vinyl interpolymers that certain unsaturated compounds polymerize very readily by themselves, but when mixed together, polymerize very slowly or not at all, or yield very inferior non-homogeneous products. Several such combinations may be cited. Chloroprene, butadiene, vinyl acetate, styrene, and vinyl chloride are all known to polymerize readily by themselves but with certain combinations such as chloroprene/vinyl acetate, butadiene/vinyl acetate, styrene/vinyl acetate and styrene/vinyl chloride polymerization takes place very slowly, if at all, and such products as are formed are non-homogeneous in composition and have little value.

In the process of this invention unsaturated compounds which when mixed together polymerize slowly or not at all, or polymerize to non-homogeneous interpolymers, can be made to interpolymerize readily by the addition of a third component which acts as an activator or blending agent for the other two. In general, the third component is a compound which is capable of interpolymerizing with either of the other two components. Thus it is known that chloroprene and butadiene polymerize readily under the usual conditions. Likewise vinyl esters polymerize without difficulty by the ordinary methods. However, it has been observed that combinations of chloroprene or butadiene with vinyl esters show very little tendency to polymerize and such products as are formed after prolonged exposure to polymerization conditions are either non-homogeneous and very inferior in properties or consist practically entirely of polymer derived from only one of the monomers. If, however, according to the process of the present invention a third component such as an acrylate or methacrylate is added to the mixtures mentioned above polymerization proceeds without difficulty to give homogeneous products which have valuable properties.

A principal advantage of the invention lies in the fact that through its application it is possible to produce interpolymers which have hitherto been practically inaccessible.

The above description and examples are intended to be illustrative only. Any modification of or variation therefrom which conforms to the spirit of the invention is intended to be included within the scope of the claims.

What is claimed is:

1. A homogeneous emulsion interpolymer of chloroprene, vinyl acetate, and methyl methacrylate.

2. A homogeneous emulsion interpolymer of 5-70% chloroprene, 5-35% vinyl acetate, and 20-80% methyl methacrylate.

3. A homogeneous emulsion interpolymer of chloroprene, vinyl acetate and a polymerizable monomeric monohydric alcohol ester of an alpha-methylene aliphatic open-chain monocarboxylic acid.

4. A homogeneous emulsion interpolymer of 5-70% chloroprene, 5-35% vinyl acetate and 20-80% of a polymerizable monomeric monohydric alcohol ester of an alpha-methylene aliphatic open-chain monocarboxylic acid.

5. A homogeneous emulsion interpolymer of chloroprene, a polymerizable monomeric vinyl ester of an alpha, beta saturated aliphatic monocarboxylic acid and a polymerizable monomeric monohydric alcohol ester of an alpha-methylene aliphatic open-chain monocarboxylic acid.

6. A homogeneous emulsion interpolymer of 5-70% chloroprene, 5-35% of a polymerizable monomeric vinyl ester of an alpha, beta saturated aliphatic monocarboxylic acid and 20-80% of a polymerizable monomeric monohydric alcohol ester of an alpha-methylene aliphatic open-chain monocarboxylic acid.

7. A homogeneous emulsion interpolymer of a polymerizable monomeric open-chain aliphatic conjugated diene, a polymerizable monomeric vinyl ester of an alpha, beta saturated aliphatic monocarboxylic acid and a polymerizable monomeric monohydric alcohol ester of an alpha-methylene aliphatic open-chain monocarboxylic acid.

8. A homogeneous emulsion interpolymer of 5–70% of a polymerizable monomeric open-chain aliphatic conjugated diene, 5–35% of a polymerizable monomeric vinyl ester of an alpha, beta saturated aliphatic monocarboxylic acid, and 20–80% of a polymerizable monomeric monohydric alcohol ester of an alpha-methylene aliphatic open-chain monocarboxylic acid, the vinyl ester being present in amount at most equal to that of the diene.

9. Process which comprises interpolymerizing an emulsion of a polymerizable monomeric open-chain aliphatic conjugated diene, a polymerizable monomeric vinyl ester of an alpha, beta saturated aliphatic monocarboxylic acid and a polymerizable monomeric monohydric alcohol ester of an alpha-methylene aliphatic open-chain monocarboxylic acid.

10. Process which comprises interpolymerizing an emulsion of chloroprene, vinyl acetate, and methyl methacrylate.

11. A homogeneous emulsion interpolymer of 5–70% chloroprene, 5–35% vinyl acetate, and 20–80% methyl acrylate.

12. A homogeneous emulsion interpolymer of 5–70% chloroprene, 5–35% vinyl butyrate, and 20–80% methyl methacrylate.

HAROLD WILFRED ARNOLD.